United States Patent
Lamson et al.

(10) Patent No.: US 10,378,362 B2
(45) Date of Patent: Aug. 13, 2019

(54) GAS TURBINE ENGINE COMPONENT COOLING CHANNELS

(71) Applicant: UNITED TECHNOLOGIES CORPORATION, Hartford, CT (US)

(72) Inventors: Scott H. Lamson, Menands, NY (US); Andrew D. Milliken, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 868 days.

(21) Appl. No.: 14/772,215

(22) PCT Filed: Mar. 13, 2014

(86) PCT No.: PCT/US2014/025268
§ 371 (c)(1),
(2) Date: Sep. 2, 2015

(87) PCT Pub. No.: WO2014/151239
PCT Pub. Date: Sep. 25, 2014

(65) Prior Publication Data
US 2016/0010467 A1   Jan. 14, 2016

Related U.S. Application Data

(60) Provisional application No. 61/788,682, filed on Mar. 15, 2013.

(51) Int. Cl.
*F01D 5/18* (2006.01)
*F01D 9/04* (2006.01)
(Continued)

(52) U.S. Cl.
CPC .......... *F01D 5/187* (2013.01); *F01D 5/186* (2013.01); *F01D 9/041* (2013.01); *F01D 9/065* (2013.01);
(Continued)

(58) Field of Classification Search
CPC .......... F01D 5/087; F01D 5/183; F01D 5/186; F01D 5/187; F01D 25/08; F01D 25/12;
(Continued)

(56) References Cited

U.S. PATENT DOCUMENTS 3,525,486 A   8/1970   Wimpenny
4,080,095 A   3/1978   Stahl
(Continued)

FOREIGN PATENT DOCUMENTS

EP   2131108 A2   9/2009
EP   2131109 A2   9/2009

OTHER PUBLICATIONS

Extended European Search Report for Application No. EP 14 76 7715 dated Sep. 30, 2016.
(Continued)

*Primary Examiner* — Dwayne J White
*Assistant Examiner* — Danielle M. Christensen
(74) *Attorney, Agent, or Firm* — Carlson, Gaskey & Olds, P.C.

(57) ABSTRACT

A component according to an exemplary aspect of the present disclosure includes, among other things, a wall, a first channel extending at least partially through the wall to a first outlet, and a second channel adjacent to the first channel and extending to a second outlet. The first channel is configured to communicate a cooling fluid along a first swirl flow path and the second channel is configured to communicate the cooling fluid along a second swirl flow path that is opposite the first swirl flow path.

11 Claims, 3 Drawing Sheets

(51) Int. Cl.
*F01D 11/08* (2006.01)
*F01D 25/12* (2006.01)
*F01D 25/30* (2006.01)
*F02C 7/18* (2006.01)
*F02C 7/25* (2006.01)
*F01D 9/06* (2006.01)
*F23R 3/00* (2006.01)

(52) U.S. Cl.
CPC .............. *F01D 11/08* (2013.01); *F01D 25/12* (2013.01); *F01D 25/30* (2013.01); *F02C 7/18* (2013.01); *F02C 7/25* (2013.01); *F23R 3/002* (2013.01); *F05D 2220/32* (2013.01); *F05D 2240/11* (2013.01); *F05D 2240/127* (2013.01); *F05D 2240/35* (2013.01); *F05D 2240/81* (2013.01); *F05D 2250/15* (2013.01); *F05D 2250/25* (2013.01); *F05D 2260/20* (2013.01); *F05D 2260/202* (2013.01); *F05D 2260/204* (2013.01); *F23R 2900/03042* (2013.01)

(58) Field of Classification Search
CPC .......... F01D 9/065; F01D 9/041; F01D 25/30; F01D 11/08; F05D 2240/11; F05D 2240/127; F05D 2240/81; F05D 2250/25; F05D 2240/15; F05D 2260/204; F05D 2260/202; F05D 2250/15; F05D 2240/35; F05D 2220/32; F05D 2260/20; F23R 2900/03042; F23R 3/002
See application file for complete search history.

(56) References Cited

U.S. PATENT DOCUMENTS

| | | |
|---|---|---|
| 4,529,358 A | 7/1985 | Papell |
| 6,254,347 B1 | 7/2001 | Shaw et al. |
| 6,539,627 B2 | 4/2003 | Fleck |
| 6,722,134 B2 | 4/2004 | Bunker |
| 6,824,360 B2 | 11/2004 | Fleck |
| 6,997,679 B2 | 2/2006 | Beddard et al. |
| 7,753,650 B1 | 7/2010 | Liang |
| 7,785,071 B1* | 8/2010 | Liang ............... F01D 5/187 416/97 R |
| 7,789,626 B1* | 9/2010 | Liang ............... F01D 5/186 416/97 R |
| 7,901,180 B2 | 3/2011 | Abdel-Messeh et al. |
| 7,905,084 B2 | 3/2011 | Murrow et al. |
| 8,128,366 B2 | 3/2012 | Strock et al. |
| 9,435,208 B2* | 9/2016 | Bunker ............... F01D 5/147 |
| 2004/0068981 A1 | 4/2004 | Siefker et al. |
| 2007/0144142 A1 | 6/2007 | Haggander |
| 2009/0304494 A1* | 12/2009 | Strock ............... F01D 5/186 415/1 |
| 2010/0119377 A1* | 5/2010 | Tibbott ............... F01D 5/186 416/97 R |
| 2013/0195650 A1* | 8/2013 | Benson ............... F01D 5/187 416/1 |
| 2013/0272850 A1* | 10/2013 | Bunker ............... F01D 5/147 415/116 |

OTHER PUBLICATIONS

International Search Report and Written Opinion for International application No. PCT/US2014/025268 dated Jul. 1, 2014.

Hedlund, et al., "Heat Transfer and Flow Phenomena in a Swirl Chamber Simulating Turbine Blade Internal Cooling," The American Society of Mechanical Engineers, 98 GT 466, Copyright 1998, 12 pages.

* cited by examiner

GAS TURBINE ENGINE COMPONENT COOLING CHANNELS

BACKGROUND

This disclosure relates to a gas turbine engine, and more particularly to a gas turbine engine component having cooling channels arranged to counteract vortices associated with film injection.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component.

SUMMARY

A component according to an exemplary aspect of the present disclosure includes, among other things, a wall, a first channel extending at least partially through the wall to a first outlet, and a second channel adjacent to the first channel and extending to a second outlet. The first channel is configured to communicate a cooling fluid along a first swirl flow path and the second channel is configured to communicate the cooling fluid along a second swirl flow path that is opposite the first swirl flow path.

In a further non-limiting embodiment of the foregoing component, the component is one of a blade, a vane, a blade outer air seal (BOAS), a combustor liner and a turbine exhaust case liner.

In a further non-limiting embodiment of either of the foregoing components, at least one of the first channel and the second channel are micro-channels.

In a further non-limiting embodiment of any of the foregoing components, at least one of the first channel and the second channel include a maximum diameter of less than 0.635 millimeters.

In a further non-limiting embodiment of any of the foregoing components, each of the first channel and the second channel extend along an axis and include a plurality of twists.

In a further non-limiting embodiment of any of the foregoing components, at least one of the first channel and the second channel twists at least one full rotation about an axis that extends through the at least one of the first channel and the second channel.

In a further non-limiting embodiment of any of the foregoing components, at least one of the first channel and the second channel is helical shaped.

In a further non-limiting embodiment of any of the foregoing components, a cross-section through the first channel and the second channel is semi-circular.

In a further non-limiting embodiment of any of the foregoing components, a cross-section through the first channel and the second channel is elliptical.

In a further non-limiting embodiment of any of the foregoing components, the first channel and the second channel are spaced apart and are parallel to one another.

A gas turbine engine according to an exemplary aspect of the present disclosure includes, among other things, a component that extends into a core flow path of the gas turbine engine. The component includes a cooling system having a first channel configured to communicate a cooling fluid along a first swirl flow path and a second channel configured to communicate the cooling fluid along a second swirl flow path that is opposite the first swirl flow path.

In a further non-limiting embodiment of the foregoing gas turbine engine, at least one of the first channel and the second channel is a micro-channel having a maximum diameter of less than 0.635 millimeters.

In a further non-limiting embodiment of either of the gas turbine engines, each of the first channel and the second channel are helical shaped.

In a further non-limiting embodiment of any of the gas turbine engines, each of the first channel and the second channel extend along an axis and include a plurality of twists.

In a further non-limiting embodiment of any of the gas turbine engines, at least one of the first channel and the second channel twists multiple full rotations about an axis that extends through the at least one of the first channel and the second channel.

In a further non-limiting embodiment of any of the gas turbine engines, the first channel and the second channel are spaced apart and are parallel to one another.

A method of cooling a component of a gas turbine engine according to another exemplary aspect of the present disclosure includes, among other things, generating a pair of counter vortices along a surface of the component to counteract a pair of naturally induced vortices associated with film injection at the surface.

In a further non-limiting embodiment of the foregoing method, the step of generating includes communicating a cooling fluid along a first swirl path of a first channel of the component and a second, opposite swirl path of a second channel of the component.

In a further non-limiting embodiment of either of the foregoing methods, the method comprises the step of discharging the cooling fluid through a first outlet of the first channel and a second outlet of the second channel at the surface to provide the film injection.

The various features and advantages of this disclosure will become apparent to those skilled in the art from the following detailed description. The drawings that accompany the detailed description can be briefly described as follows.

DETAILED DESCRIPTION

Figure 1:
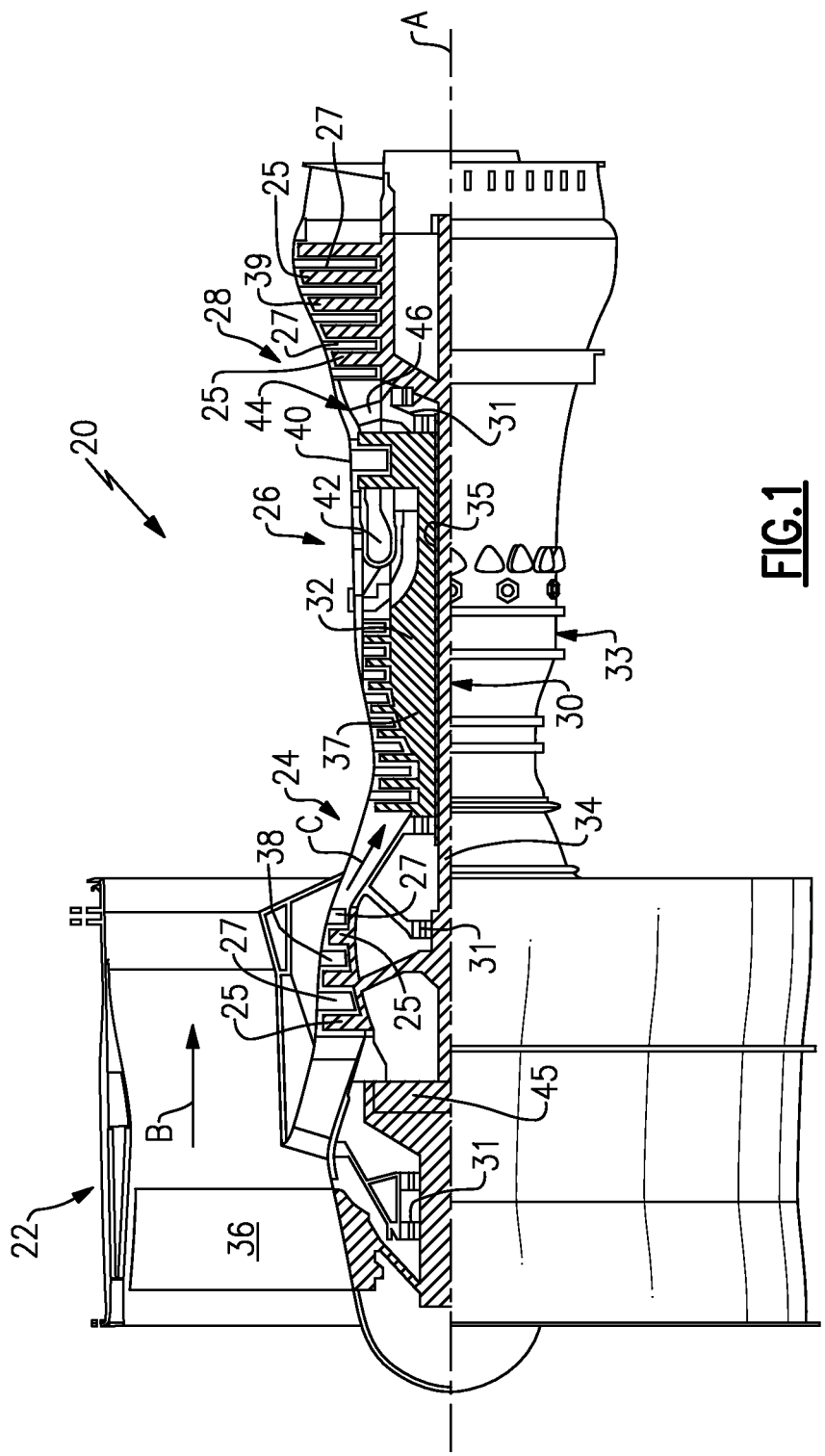
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram° R)/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of a gas turbine engine 20, including but not limited to the airfoil and platform sections of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require dedicated cooling systems to cool the parts during engine operation. This disclosure relates to cooling channel pairs that may be incorporated into the components of the gas turbine engine as part of a cooling system for counteracting naturally induced vortex pairs associated with film injection.

Figure 2:
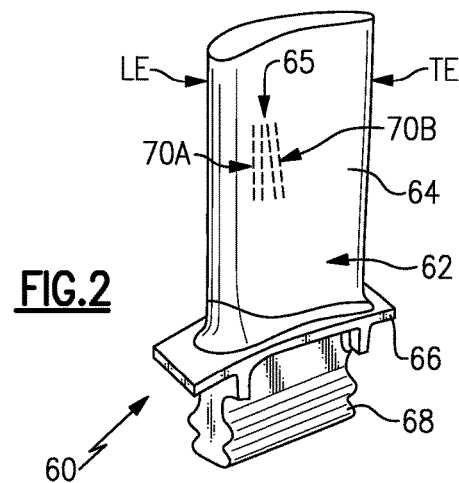
FIG. 2 illustrates a gas turbine engine component.

FIG. 2 illustrates a component 60 having an internal cooling system 65 for circulating a cooling fluid, such as relatively cool air from the compressor section 24, to cool the component 60. In this embodiment, the component 60 is a turbine blade of the turbine section 28. It is to be understood; however, that the embodiments described herein are not limited to blades or airfoils and can also be applied to blade outer air seals (BOAS), combustor liners, case structures, turbine exhaust case liners or other components that utilize dedicated internal cooling, for example.

In one embodiment, the component 60 has a body 62 that defines an external and internal shape with respect to internal passages. The body 62 extends between a leading edge LE and a trailing edge TE and may include an airfoil section 64, a platform 66 and a root 68. The airfoil section 64 extends outwardly from the platform 66 and the root 68 extends outwardly in an opposed direction from the platform 66.

The exemplary cooling system 65 includes two or more internal micro-channels formed inside the body 62, portions of which are schematically shown as 70A, 70B (hereafter "first channel 70A" and "second channel 70B"). Although not shown, the first and second channels 70A, 70B may be fed with cooling fluid from a main cooling cavity of the component 60. The first and second channels 70A, 70B can be micro-channels that have a maximum diameter of less than 0.635 millimeters (0.025 inches). In another embodiment, the first and second channels 70A, 70B define a maximum diameter of less than 0.5 millimeters (0.020 inches). In yet another embodiment, a maximum diameter of the first and second channels 70A, 70B is less than 0.25 millimeters (0.010 inches). The relatively small dimensioned first and second channels 70A, 70B may also be referred to as vascular channels.

Figure 3:
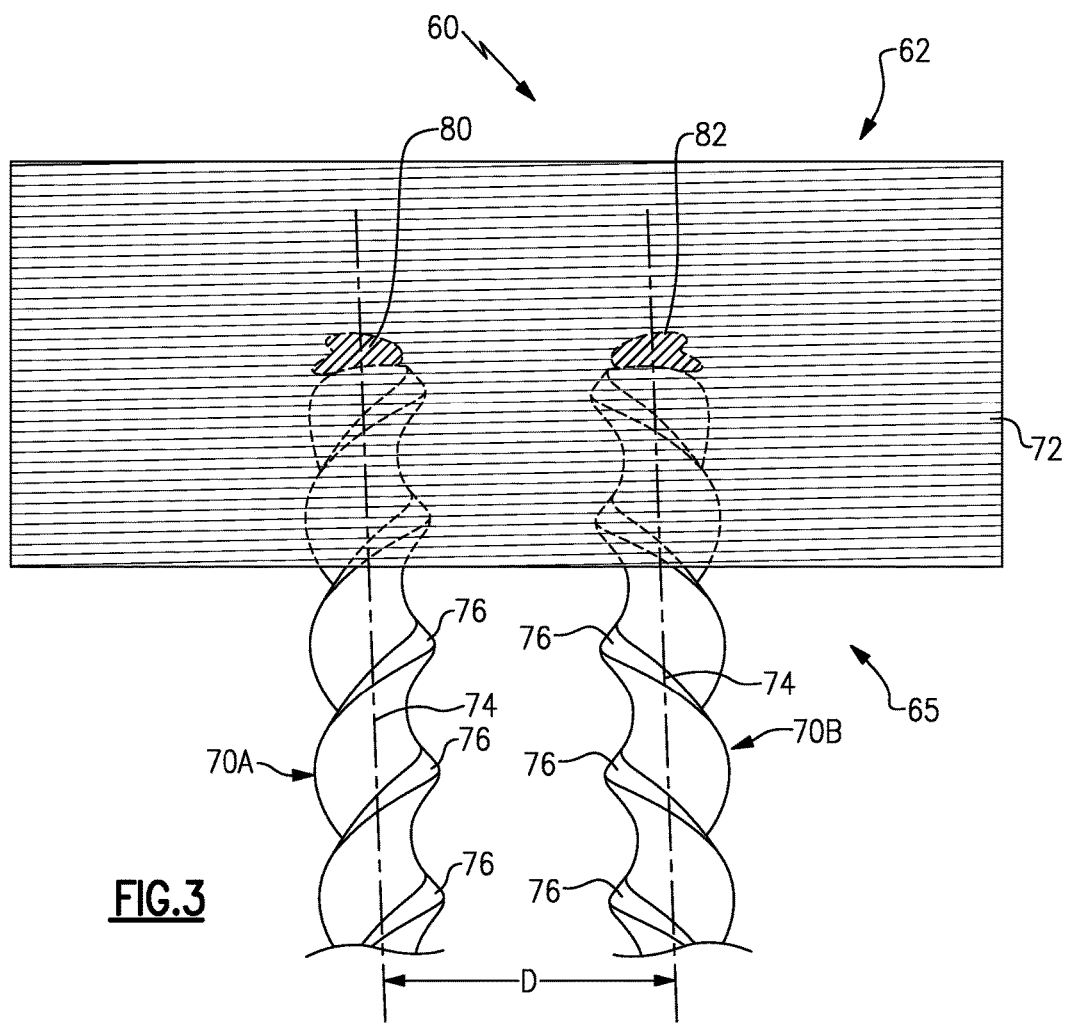
FIG. 3 illustrates an exemplary cooling system that can be incorporated into a gas turbine engine component.

FIG. 3 illustrates a magnified, isolated view of the first channel 70A and the second channel 70B of the cooling system 65. The first and second channels 70A, 70B can extend through a wall 72 of the body 62, such as an internal or external wall. Furthermore, although the first and second channels 70A, 70B are depicted in FIG. 2 as being located inside the airfoil section 64, the first and second channels 70A, 70B can alternatively be located in the platform 66 or root 68, or can span between two or more of the airfoil section 64, platform 66 and root 68.

In one embodiment, each of the first and second channels 70A, 70B extend along an axis 74 and include a plurality of twists 76. The first and second channels 70A, 70B may be linear or non-linear. The first and second channels 70A, 70B may twist, by a twist amount in degrees, with respect to the axes 74 to establish the plurality of twists 76. In one embodiment, the first and second channels 70A, 70B twist one or more rotations (greater than or equal to 365°) about the axes 74.

In another embodiment, the first and second channels 70A, 70B are helical shaped. A cross-section taken perpendicular to the axes 74 may be either semi-circular or elliptical, for example.

The combination of the twist amount and the diameter of each channel 70A, 70B serve to produce a desired type of swirling flow of a cooling fluid through the first and second channels 70A, 70B. The swirling flow may define a swirl vector that is parallel to the axes 74, which may enhance the cooling effect in the component 60. For example, the swirl vector increases a co-efficient of heat transfer between the cooling fluid and the body 62 of the component 60. Thus, the twist amount and diameter of each of the first and second channels 70A, 70B provide enhanced cooling capability in the component 60.

The first channel 70A and the second channel 70B may be positioned adjacent to one another such that a distance D extends between the axes 74. The dimension of the distance D may vary depending on design specific parameters including the amount of required cooling, among other factors. The first channel 70A and the second channel 70B may be parallel to one another.

The first channel 70A may extend to a first outlet 80 and the second channel 70B may extend to a second outlet 82. The outlets 80, 82 may extend through the wall 72. The outlets 80, 82 may include any shape for discharging cooling fluid from the first and second channels 70A, 70B, such as via film injection.

Figure 4:
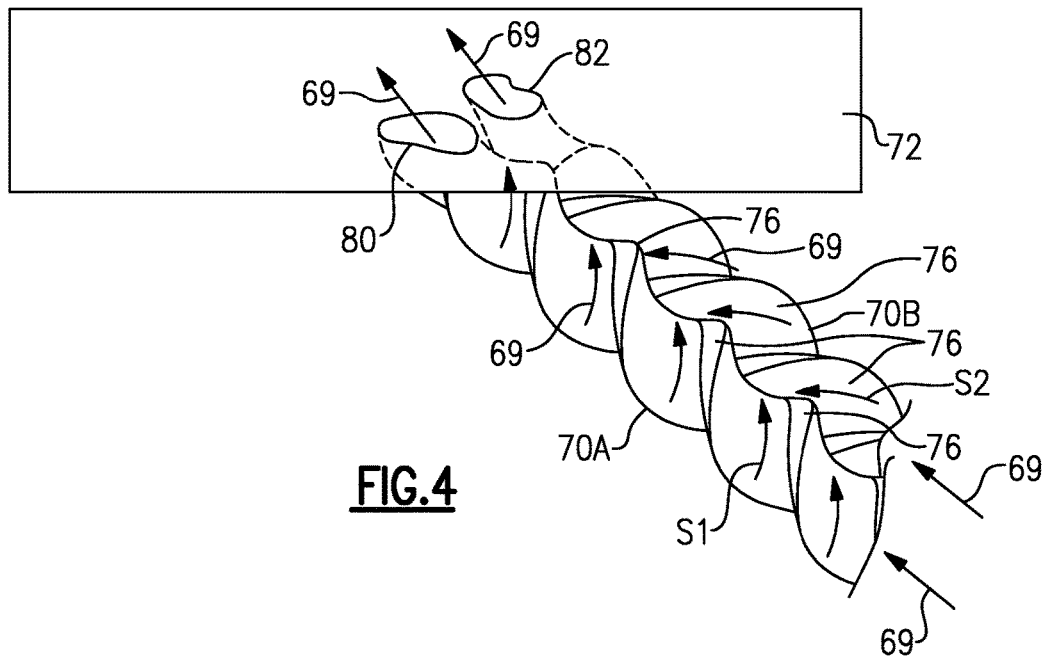
FIG. 4 illustrates additional features of the cooling system of FIG. 3.

In one embodiment, the first and second channels 70A, 70B are configured to communicate cooling fluid along opposite flow paths. For example, as shown in FIG. 4, the first channel 70A may define a first swirl flow path S1 of a cooling fluid 69 and the second channel 70B may define a second swirl flow path S2 of cooling fluid 69 that is opposite of the first swirl flow path S1. In other words, the flow of the cooling fluid 69 swirls in opposite directions inside the first channel 70A and the second channel 70B, as further discussed below. The second channel 70B may be oriented to define the opposite swirl flow path S2 by displacing its twists 76 by 180° relative to the twists 76 of the first channel 70A.

Figure 5:
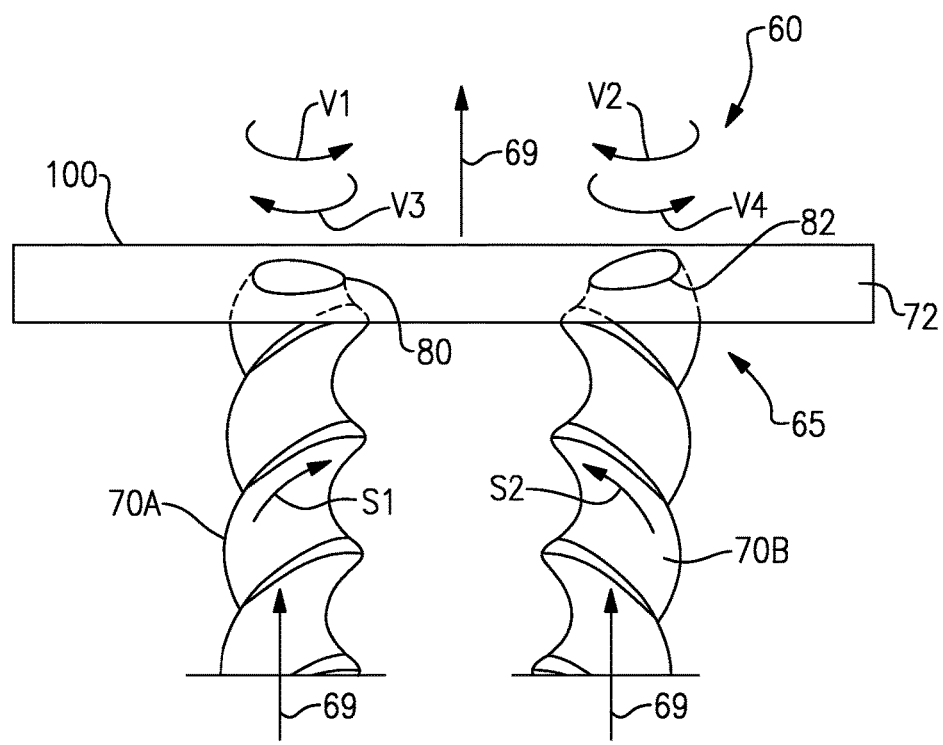
FIG. 5 illustrates a cooling system implementation for counteracting naturally induced vortex pairs associated with film injection.

FIG. 5 schematically illustrates cooling of a component 60 using the cooling system 65. A cooling fluid 69 is introduced into both the first channel 70A and the second channel 70B. Of course, additional channels, positioned in pairs, could be incorporated into the cooling system 65. Due to the twist of the first and second channels 70A, 70B, the cooling fluid 69 is forced to flow along the first swirl flow path S1 and the second swirl flow path S2 inside of the first and second channels 70A, 70B.

The cooling fluid 69 naturally induces vortices V1, V2 as it is discharged along a surface 100 of the component 60 through the first and second outlets 80, 82 as film injection at the surface 100. The flow of the cooling fluid 69 along the first and second swirl flow paths S1, S2 generates a pair of counter vortices V3, V4 that counteract the vortices V1, V2, thereby improving heat transfer with only modest pressure loss and reducing aerodynamic loss in the cooling fluid 69.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
a wall;
a first channel extending at least partially through said wall from a first inlet to a first outlet along a first axis;
a second channel adjacent to said first channel and extending from a second inlet to a second outlet along a second axis;
said first channel configured to communicate a cooling fluid along a first swirl flow path and said second channel configured to communicate said cooling fluid along a second swirl flow path that is opposite said first swirl flow path; and
wherein each of said first channel and said second channel include a plurality of twists that twist multiple full rotations about said respective first and second axes, and said respective first and second axes extend through and intersect a length of a respective one of said plurality of twists.

2. The component as recited in claim 1, wherein said component is one of a blade, a vane, a blade outer air seal (BOAS), a combustor liner and a turbine exhaust case liner.

3. The component as recited in claim 1, wherein at least one of said first channel and said second channel are micro-channels.

4. The component as recited in claim 1, wherein at least one of said first channel and said second channel include a maximum diameter of less than 0.635 millimeters.

5. The component as recited in claim 1, wherein a cross-section through said first channel and said second channel is semi-circular.

6. The component as recited in claim 1, wherein a cross-section through said first channel and said second channel is elliptical.

7. The component as recited in claim 1, wherein said first channel and said second channel are spaced apart and are parallel to one another.

8. A gas turbine engine, comprising:
a component that extends into a core flow path of said gas turbine engine, wherein said component includes a cooling system having:
a first channel configured to communicate a cooling fluid along a first axis with a first swirl flow path;
a second channel configured to communicate said cooling fluid along a second axis with a second swirl flow path that is opposite said first swirl flow path;
wherein each of said first channel and said second channel include a plurality of twists that twist multiple full rotations about said respective first and second axes, and said respective first and second axes extend through and intersect a length of a respective one of said plurality of twists.

9. The gas turbine engine as recited in claim 8, wherein at least one of said first channel and said second channel is a micro-channel having a maximum diameter of less than 0.635 millimeters.

10. The gas turbine engine as recited in claim 8, wherein said first channel and said second channel are spaced apart and are parallel to one another.

11. The gas turbine engine as recited in claim 10, wherein said component is one of a blade, a vane, a blade outer air seal (BOAS), a combustor liner and a turbine exhaust case liner.

* * * * *